United States Patent
Noguchi et al.

[15] 3,694,456
[45] Sept. 26, 1972

[54] 1-DISUBSTITUTED AMINOPYRAZOLES

[72] Inventors: Shunsaku Noguchi; Shoji Kishimoto, both of Osaka; Kiyohisa Kawai, Kyoto, all of Japan

[73] Assignee: Takeda Chemical Industries, Ltd., Higashi-ku, Osaka, Japan

[22] Filed: May 8, 1970

[21] Appl. No.: 35,926

[52] U.S. Cl. ....260/310 R, 260/247.5 R, 260/268 N, 260/268 H, 260/293.63, 260/293.67, 260/293.7, 260/307 F, 424/248, 424/250, 424/267, 424/273
[51] Int. Cl. ...........................................C07d 49/20
[58] Field of Search........260/310 R, 247.5 R, 268 N, 260/268 H, 293.7, 293.63

[56] References Cited

UNITED STATES PATENTS

| | | |
|---|---|---|
| 3,254,093 | 5/1966 | Huijgen et al..........260/310 R |
| 3,207,763 | 9/1965 | Harder....................260/310 R |
| 3,274,203 | 9/1966 | Dickinson..............260/310 R |
| 3,312,690 | 4/1967 | Masuda et al. .........260/307 F |

FOREIGN PATENTS OR APPLICATIONS

44/32,411   12/1969   Japan.....................260/307 F

OTHER PUBLICATIONS

Imashiro et al., Chem. Abst., Vol. 72, No. 111482q (1970).

*Primary Examiner*—Natalie Trousof
*Attorney*—Wenderoth, Lind & Ponack

[57] ABSTRACT

1-(Disubstituted-amino)pyrazole compounds are provided herein of the formula:

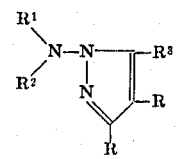

wherein each of $R^1$ and $R^2$ stands for lower alkyl or $R^1$ and $R^2$, taken together with the adjacent N-atom form morpholino, piperidino, pyrrolidino, N-methylpiperazino, N-benzylpiperazino and N-phenylpiperazino, R's, which are the same or different from each other, stand for hydrogen, alkyl having one to ten carbon atoms, phenyl, naphthyl, phenyl or naphthyl substituted by halogen or lower alkyl, respectively, and $R^3$ stands for hydrogen, lower alkyl, N,N-di-loweralkylaminoethyl, N-morpholinomethyl, N-piperidinomethyl, N-pyrrolidinomethyl, N-methylpiperazinomethyl, N-benzylpiperazinomethyl and N-phenylpiperazinomethyl. The above compounds as well as the pharmaceutically acceptable salts thereof are useful as analgesics, antipyretics and mild muscle relaxants.

10 Claims, No Drawings

1-DISUBSTITUTED AMINOPYRAZOLES

This invention relates to a novel and useful 1-(disubstituted-amino)pyrazole and to the production of it. More concretely, this invention relates to a novel amino pyrazole of the general formula (I) and acid salts thereof which have characteristic effects as analgesics, antipyretics and mild muscle relaxants, etc.

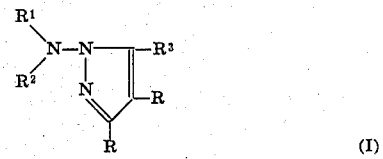

(I)

wherein each of $R^1$ and $R^2$ stands for a lower alkyl or $R^1$ and $R^2$, taken together with the adjacent N-atom, form a heterocyclic ring, R's, which are the same with or different from each other, stand for hydrogen, alkyl, aryl or substituted aryl respectively, $R^3$ stands for hydrogen, lower alkyl or N,N-disubstituted aminomethyl.

The lower alkyl represented by each of $R^1$, $R^2$ and $R^3$ in the formula (I) is exemplified by alkyl having from one to five carbon atoms such as methyl, ethyl, n-propyl, isopropyl, n-butyl, isobutyl, sec.-butyl, tert.-butyl, amyl, isoamyl, etc., when $R^1$ and $R^2$ taken together with the adjacent nitrogen atom form a heterocyclic ring, the ring is exemplified by a five or six membered heterocyclic ring such as morpholino, piperidino, pyrrolidino, N-substituted piperazino, for example, N-methylpiperazino, N-benzylpiperazino, N-phenylpiperazino, etc.

The alkyl represented by R may be straight-chained, branched, cyclic and is exemplified by alkyl having one to 10 carbon atoms such as methyl, ethyl, propyl, isopropyl, butyl, isobutyl, sec.-butyl, pentyl, hexyl, cyclohexyl, octyl, decyl, etc. The aryl represented by R is exemplified by phenyl, α-naphthyl and β-naphthyl, etc. The substituted aryl represented by R is exemplified by phenyl, α-naphthyl and β-naphthyl which have one or more substituents such as lower alkyl (e.g. methyl, ethyl, propyl, isopropyl, butyl, isobutyl, sec.-butyl, tert.-butyl, etc.) and halogen (e.g. fluoro, chloro, bromo, etc.) on their rings. The N,N-disubstituted aminomethyl represented by $R^3$ is exemplified by N,N-dimethylaminomethyl, N,N-diethylaminoethyl, N,N-dipropylaminomethyl, morpholinomethyl, pyrrolidinomethyl, piperidinomethyl and substituted piperazinomethyl (e.g. N-methylpiperazinomethyl, N-benzylpiperazinomethyl, N-phenylpiperazinomethyl, etc.).

The new compound (I) is produced by reacting a sydnone compound of the formula (II):

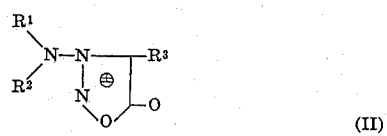

(II)

wherein $R^1$, $R^2$ and $R^3$ are the same as defined above with an acetylene compound of the formula (III):

(III)

wherein R's are the same as defined above.

The reaction is conducted in the presence or absence of a suitable organic solvent such as xylene, tetralin (1,2,3,4-tetrahydronaphthalene), p-cymene, chlorobenzene, mesitylene, decalin (decahydronaphthalene), etc.

The reaction is desirably conducted at an elevated temperature of not lower than 100° C, more desirably conducted at about 150°–270° C. When the solvent is xylene, for instance, the reaction proceeds so slow that a few days are required even under reflux conditions. In contrast, when tetralin is used and the reaction mixture is heated at about 200°C, the reaction completes in several hours.

The proportion of the starting materials employed in the reaction may be freely employed because both the unreacted starting sydnone compound (II) and acetylene compound (III) may be easily removed from the resulting mixture. Usually, however, the starting materials are desirably reacted either in equimolar proportions or in the presence of an excess of acetylene compound.

Incidentally, when an asymmetrical acetylene compound is employed, there are concurrently formed two position isomers of the resulting pyrazole. These two isomers have radicals exchanged from each other at 3- and 4-positions of pyrazole ring. In any way, both isomers show effective biological activity.

Both position isomers are independently separable from the reaction mixture by means of per se known separating method such as recrystallization and column chromatography. Column-chromatography on silica gel or alumina with benzene, chloroform, ethylacetate or a mixture thereof as a developing solvent is successfully employed.

When $R^3$ stands for a hydrogen atom or lower alkyl, the resulting pyrazole compound is weakly basic. For instance, if 1-dimethylamino-3-phenylpyrazole is dissolved in ether and dry hydrogen chloride gas is bubbled into the solution, crystals of the monohydrochloride is obtained. This compound is rather unstable and, upon addition of water, is reconverted to the free base.

On the other hand, where $R^3$ is N,N-disubstituted aminomethyl group, the resulting pyrazol compound is strongly basic and, when treated with a mineral acid such as hydrochloric acid, hydrobromic acid, nitric acid, sulfuric acid and phosphoric acid, etc. or an organic acid such as picric acid, toluenesulfonic acid, tartaric acid, oxalic acid, maleic acid, succinic acid and citric acid, etc., give a stable mono-acid salt.

The product of this invention has an effective analgesic, mild muscle relaxing and antipyretic activity and is generally administered orally in a form of tablet, powder, capsule, etc., or by way of injection.

A typical effective dose of the product of this invention, when administered orally to human adult, is usually about 0.05 g. to 2.0 g. a day, desirably 0.3 g. to 1.0 g. a day and when administered intravenously, is usually about 0.025 g. to 1.0 g. per dose. Of course, an increased or reduced dose is also effective on symptoms.

The physiological activity of the compounds of this invention is demonstrated in the following tests.

Test for acute toxicity

Each compound suspended with 4 percent gum acasia in physiological saline was administered intraperitoneally to groups each consisting of 3 mice (IRC–JCL strain, each weighing 18± 2g.). Thus administered mice were observed for 8 days to calculate $LD_{50}$. The results are shown in Table 1.

Test for analgesic activity

Each compound suspended with 4% gum acasia in water was administered orally to groups each consisting of 10 mice (IRC-JCL strain, each weighing 18±2g.) by use of a stomach tube, and analgesic activity was estimated according to "Phenylquinone writhing syndrome method"(cf. E.A. Siegmund et al , J. Pharmacology and Experimental Therapeutics , 119, 184(1957)). The results are shown in Table 1.

TABLE 1

| Compound | Acute toxicity $LD_{50}$ mg./Kg. | Analgesic activity Dose (mg./Kg.) | Inhibiting rate (%) |
| --- | --- | --- | --- |
| 1-dimethylamino-3-phenylpyrazole | ≥ 250 | 50 | 76.7 |
| 1-dimethylamino-3-(p-tolyl)pyrazole | 250–500 | 50 | 78.8 |
| 1-dimethylamino-3-(p-chlorophenyl)-pyrazole | 250–500 | 50 | 74.8 |
| 1-piperidino-3-(p-chlorophenyl)-pyrazole | >500 | 50 | 51.7 |
| 1-dimethylamino-3-(p-chlorophenyl)-5-methylpyrazole | >500 | 50 | 68.9 |
| 1-dimethylamino-4-(p-chlorophenyl)-5-methylpyrazole | 250–500 | 50 | 98.0 |
| 1-dimethylamino-3-phenyl-4-methylpyrazole | 250–500 | 50 | 96.0 |

It is to be understood that the following examples are solely for the purpose of illustration and not to be construed as limitations of this invention, and that minor variations may be resorted to without departing from the spirit and scope of this invention. Throughout the specification, "kg.", "g.", "mg.", "ml." and "mm" stand for "kilogram(s)", "gram(s)", "milligram(s)", "milliliter(s)" and "millimeter" respectively.

EXAMPLE 1

To 100 ml. of tetralin are added 12.9 g. of 3-dimethylaminosydnone and 20.4 g. of phenylacetylene, and the mixture is refluxed at 210°–220° C for 8 hours. Then, the excess of phenylacetylene and tetralin are removed from the reaction mixture by distillation under reduced pressure and the residue is fractionated under reduced pressure, whereby an oily product of 1-dimethylamino-3-phenylpyrazole boiling at 111°–115° C/4.5 mm Hg. is obtained. After being left standing over night the product crystallizes. m.p. 35°–36° C Analysis $C_{11}H_{13}N_3$

| | C(%) | H(%) | N(%) |
| --- | --- | --- | --- |
| Calculated | 70.56 | 7.00 | 22.44 |
| Found | 70.79 | 6.90 | 22.38 |

The following compounds are synthesized by the same manner as above.

1-Dimethylamino-3-(p-tolyl)pyrazole, b.p. 134°–137 °C/5.5 mm Hg.

1-Dimethylamino-3-(p-chlorophenyl)pyrazole, b.p. 115°–116° C/0.65 mm Hg. m.p. 45°–48°C.

EXAMPLE 2

To 60 ml. of tetralin are added 3.8g. of 3-morpholinosydnone and 4.6g. of phenylacetylene and the mixture is refluxed at about 240°C for 9 hours. The tetralin and excess of phenylacetylene are removed by vacuum distillation, and the residue is column-chromatographed on a column of 400 g. of silica gel, using a mixture of ethylacetate and benzene (1:20) as a developing solvent.

The objective fractions are collected, and the solvent is removed under reduced pressure to leave crude crystals, which are allowed to recrystallize from n-hexane, whereby crystals of 1-morpholino-3-phenyl-pyrazole melting at 94°–95°C are obtained.

Analysis $C_{13}H_{15}N_3O$

| | C(%) | H(%) | N(%) |
| --- | --- | --- | --- |
| Calculated | 68.10 | 6.59 | 18.33 |
| Found | 68.46 | 6.63 | 18.64 |

EXAMPLE 3

To 120 ml. of tetralin are added 13.7 g. of 3-dimethylamino-4-morpholinomethylsydnone and 7.4 g. of phenylacetylene, and the mixture is refluxed at 205°–210° C for 8 hours, whereby 1-dimethylamino-3-phenyl-5-morpholinomethyl-pyrazole and its position isomer 1-dimethylamino-4-phenyl-5-morpholinomethylpyrazole are produced in the reaction mixture. After the tetralin and the excess of phenylacetylene are removed by the distillation in vacuo, the residue is column-chromatographed on 400g. silica gel with 4 liters of a mixture of ethyl acetate and chloroform (1:1) using as a developing solvent to separate the isomers from each other. Objective fractions are detected by Dragendorff reagent and ultraviolet absorption. First, the 4-phenyl compound and then the 3-phenyl compound is eluted from the column. After the solvent is distilled off from the latter fraction, the residue is recrystallized from 50 percent ethanol, whereby 1-dimethylamino-3-phenyl-5-morpholinomethylpyrazole melting at 81°–84° C is obtained. The chemical structure of the product is confirmed by the nuclear magnetic resonance spectrum.

Analysis $C_{16}H_{22}N_4O$

| | C(%) | H(%) | N(%) |
| --- | --- | --- | --- |
| Calculated | 67.11 | 7.74 | 19.56 |
| Found | 66.91 | 7.65 | 19.49 |

4.0g. of the above product is treated with methanolic solution of hydrogen chloride and the resulting hydrochloride is recrystallized from 150 ml. of benzene, whereupon colorless crystals of 1-dimethylamino-3-phenyl-5-morpholinomethylpyrazole monohydrochloride melting at 175°–178°C (with decomposition) are obtained.

Analysis $C_{16}H_{23}N_4OCl$

| | C(%) | H(%) | N(%) |
| --- | --- | --- | --- |
| Calculated | 59.53 | 7.18 | 17.36 |
| Found | 59.31 | 7.01 | 17.09 |

As the solvent is removed by distillation from the former fraction and the residue is recrystallized from n-hexane, 1-dimethylamino-4-phenyl-5-morpholinomethylpyrazole melting at 82°–84° C is obtained. The chemical structure of the product is confirmed by the nuclear magnetic resonance spectrum.

Analysis $C_{16}H_{22}N_4O$

|  | C(%) | H(%) | N(%) |
|---|---|---|---|
| Calculated | 67.11 | 7.74 | 19.56 |
| Found | 67.17 | 7.58 | 19.62 |

Monohydrochloride of the above compound is obtained by the same manner as above. m.p.193°–196° (with decomposition).

Analysis $C_{16}H_{23}N_4OCl$

|  | C(%) | H(%) | N(%) |
|---|---|---|---|
| Calculated | 59.53 | 7.18 | 17.36 |
| Found | 59.34 | 7.17 | 17.39 |

The following compounds are obtained after the manner as above.

1-dimethylamino-3-(p-chlorophenyl)-5-morpholinomethylpyrazole monohydrochloride m.p. 224°–226° C (with decomposition)

1-dimethylamino-4-(p-chlorophenyl)-5-morpholinomethylpyrazole m.p.119°–120° C 1-dimethylamino-3-phenyl-5-dimethylaminomethylpyrazole monohydrochloride m.p.211°–213° C (with decomposition)

EXAMPLE 4

To 100 ml. of tetralin are added 11.4 g. of 3-dimethylamino-4-morpholinomethylsydnone and 8.9g. of diphenyl acetylene and the mixture is refluxed at 240°–250°C for 16 hours. Then the reaction mixture is poured into a large quantity of ether and subject to extraction with a diluted aqueous hydrochloric acid. The extract is neutralized with sodium bicarbonate and the precipitates are extracted with ether. The ether extract is washed with water and dried, followed by removal of the ether under reduced pressure. The residue is recrystallized from n-hexane, whereby crystals of 1-dimethylamino-3,4-diphenyl-5-morpholinomethylpyrazole having melting at 118°–120° C are obtained.

Analysis $C_{22}H_{26}N_4O$

|  | C(%) | H(%) | N(%) |
|---|---|---|---|
| Calculated | 72.90 | 7.23 | 15.46 |
| Found | 73.03 | 7.17 | 15.69 |

The above product is treated with methanolic solution of hydrogen chloride and the resulting hydrochloride is recrystallized from a mixture of 150 ml. of acetone and 100 ml. of ether, whereupon colorless crystals of 1-dimethylamino-3,4-diphenyl-5-morpholinomethylpyrazole monohydrochloride melting at 218°–220°C (with decomposition) are obtained.

Analysis $C_{22}H_{27}N_4OCl$

|  | (C%) | H(%) | N(%) |
|---|---|---|---|
| Calculated | 66.22 | 6.82 | 14.04 |
| Found | 66.26 | 6.88 | 14.07 |

EXAMPLE 5

4.3 g. of 3-dimethylamino-4-methylsydnone and 5.4 g. of diphenylacetylene are added to 60 ml. of tetralin and the mixture is refluxed at 230°–240° C for 8 hours. The tetralin is removed from the reaction mixture by distillation in vacuo and the residue is purified by column-chromatography on silica gel with benzene as a developing solvent. The solvent is distilled off from an objective fraction and the residue is recrystallized from 60 ml. of n-hexane, whereby colorless crystals of 1-dimethylamino-3,4-diphenyl-5-methylpyrazole melting at 121°–123° C are obtained.

Analysis $C_{18}H_{19}N_3$

|  | C(%) | H(%) | N(%) |
|---|---|---|---|
| Calculated | 77.94 | 6.91 | 15.15 |
| Found | 77.65 | 6.90 | 15.03 |

EXAMPLE 6

To 50 ml. of tetralin are added 3.10 g. of 3-dimethylaminosydnone and 3.56 g. of diphenylacetylene, and the mixture is refluxed at 210°–230° C for 7 hours. The tetralin is removed from the reaction mixture by distillation under reduced pressure and the residue is fractionated by vacuum distillation, whereby 1-dimethylamino-3,4-diphenylpyrazole boiling at 202° C/8.5 mm Hg is obtained. After being left standing overnight the product crystallizes. m.p.54°–61° C.

Analysis $C_{17}H_{17}N_3$

|  | C(%) | H(%) | N(%) |
|---|---|---|---|
| Calculated | 77.53 | 6.51 | 15.96 |
| Found | 77.87 | 6.56 | 15.55 |

EXAMPLE 7

To 20 ml. of tetralin are added 1.0 g. of 3-morpholinosydnone and 1.0 g. of diphenylacetylene and the mixture is refluxed at 220°–240° C for 8 hours. Then tetralin is removed from the reaction mixture by distillation under reduced pressure, the residue is purified by column chromatography on silica gel with a mixture of benzene and ethylacetate (20:1) used as a developer. The solvent is distilled off from an objective fraction, whereupon pale brown crystals of 1-morpholino-3,4-diphenylpyrazole are obtained. m.p. 107°–109° C.

Analysis $C_{19}H_{19}N_3O$

|  | C(%) | H(%) | N(%) |
|---|---|---|---|
| Calculated | 74.73 | 6.27 | 13.76 |
| Found | 75.02 | 6.34 | 13.81 |

The following compound is obtained by the same manner as above.

1-piperidino-3,4-diphenylpyrazole, m.p. 96°–101° C.

EXAMPLE 8

To 100 ml. of tetralin are added 8.2 g. of 3-dimethylamino-4-methylsydnone and 9.5 g. of p-chlorophenylacetylene and the mixture is refluxed at 230°–250° C for 8 hours. Then tetralin is removed from the reaction mixture by distillation under reduced pressure, the residue is column chromatographed on 400 g. of silica gel with 4 liters of benzene as a developer to separate position isomers each other. First, the 3-p-chlorophenyl compound, and then, the 4-p-chlorophenyl compound is eluted from the column. The crude crystals obtained from the former fraction are recrystallized from n-hexane to obtain-1-dimethylamino-3-(p-chlorophenyl)-5-methylpyrazole as colorless crystals. m.p.83°–85° C.

The chemical structure of the product is confirmed by the nuclear magnetic resonance spectrum.

Analysis $C_{12}H_{14}N_3Cl$

|  | C(%) | H(%) | N(%) |
|---|---|---|---|
| Calculated | 61.14 | 5.99 | 17.83 |
| Found | 61.07 | 5.97 | 18.05 |

The crude crystals obtained from the latter fraction are recrystallized from n-hexane, and the crystals of 1-dimethylamino-4-(p-chlorophenyl)-5-methylpyrazole melting at 84°–85° C are obtained.

The chemical structure of the product is confirmed by the nuclear magnetic resonance spectrum.

Analysis $C_{12}H_{14}N_3Cl$

|  | C(%) | H(%) | N(%) |
|---|---|---|---|
| Calculated | 61.14 | 5.99 | 17.83 |
| Found | 61.13 | 6.03 | 18.14 |

The following compounds are obtained by the same manner as above.

1-dimethylamino-3-phenyl-5-methylpyrazole m.p.54°–6° C 1-dimethylamino-4-phenyl-5-methylpyrazole b.p. 105°–108°C/0.75 mm Hg.

EXAMPLE 9

To 120 ml. of tetralin are added 9.9 g. of 3-dimethylaminosydnone and 8.9 g. of 1-phenyl-1-propyne and the mixture is refluxed at 220°–240° C for 8 hours. Tetralin is removed from the reaction mixture by distillation under reduced pressure and the residue is column chromatographed on 900 g. of silica gel with 9 liters of a mixture of benzene and ethylacetate (20:1) as a developing solvent to separate position isomers each other. First, the 3-phenyl-4-methyl compound, and then, the 4-phenyl-3-methyl compound is eluted from the column. After removing the solvent from the former fraction, the residue is fractionated under reduced pressure, whereby 1-dimethyl-amino-3-phenyl-4-methylpyrazole boiling at 137°C/6 mm Hg. is obtained.

The chemical structure of the product is confirmed by the nuclear magnetic resonance spectrum.

Analysis $C_{12}H_{15}N_3$

|  | C(%) | H(%) | N(%) |
|---|---|---|---|
| Calculated | 71.61 | 7.51 | 20.88 |
| Found | 71.67 | 7.54 | 20.35 |

From the latter fraction, 1-dimethylamino-3-methyl-4-phenylpyrazole boiling at 124°–125°C/3mm Hg. is obtained. The chemical structure of the product is confirmed by the nuclear magnetic resonance spectrum.

Analysis $C_{12}H_{15}N_3$

|  | C(%) | H(%) | N(%) |
|---|---|---|---|
| Calculated | 71.61 | 7.51 | 20.88 |
| Found | 71.98 | 7.61 | 20.55 |

The following compounds are obtained by the same manner as above.

1-dimethylamino-4,5-dimethyl-3-phenylpyrazole. b.p. 133° C/2.7 mm Hg.

1-dimethylamino-3,5-dimethyl-4-phenylpyrazole b.p. 136° C/2.5 mm Hg., m.p. 43°–47° C.

EXAMPLE 10

To 50 ml. of tetralin are added 3.4 g. of 3-piperidinosydnone and 2.7 g. of p-chlorophenylacetylene and the mixture is refluxed at 240°–250° C for 7 hours. Tetralin is distilled out of the reaction mixture under reduced pressure. The residue is column-chromatographed on a column of 400 g. of silica gel with 4 liters of benzene as developing solvent. First 3-p-chlorophenyl compound and then, 4-p-chlorophenyl compound is eluted. After removing the solvent from the former fraction, the residue is recrystallized from benzene, whereby 1-piperidino-3-(p-chlorophenyl)pyrazole melting at 85°–89° C is obtained. The chemical structure of the product is confirmed by the nuclear magnetic resonance spectrum.

Analysis $C_{14}H_{16}N_3Cl$

|  | C(%) | H(%) | N(%) |
|---|---|---|---|
| Calculated | 64.23 | 6.16 | 16.05 |
| Found | 64.33 | 6.17 | 16.17 |

The solvent is removed from the latter fractions, whereupon crystals of 1-piperidino-4-(p-chlorophenyl)-pyrazole melting at 108°–112° C are obtained. The chemical structure of the product is confirmed by the nuclear magnetic resonance spectrum.

Analysis $C_{14}H_{16}N_3Cl$

|  | C(%) | H(%) | N(%) |
|---|---|---|---|
| Calculated | 64.23 | 6.16 | 16.05 |
| Found | 64.56 | 6.18 | 15.78 |

EXAMPLE 11

To 20 ml. of tetralin are added 2.3 g. of 3-dimethylamino-4-morpholinomethylsydnone and 1.2 g. of 1-phenyl-1-propyne and the mixture is refluxed at 220°–250° C for 15 hours. After cooling, the reaction mixture is poured into a large quantity of ether and extracted with a diluted hydrochloric acid. The extracted solution is neutralized with sodium bicarbonate and extracted with ether. After being washed with water, ether is distilled off and the residue is purified by column-chromatography on 100 g. of silica gel using 200 ml. of ethylacetate as developing solvent. Objective fractions are collected and the solvent is distilled off. The residue is treated with methanolic solution of hydrogen chloride and the resulting monohydrochloride is recrystallized from acetone, whereby colorless crystals of 1-dimethylamino-3-methyl-4-phenyl-5-morpholinomethylpyrazole monohydrochloride are obtained. m.p.204°–212° C (with decomposition)

The chemical structure of the product is confirmed by the nuclear magnetic resonance spectrum.

Analysis $C_{17}H_{25}N_4OCl$

|  | C(%) | H(%) | N(%) |
|---|---|---|---|
| Calculated | 60.61 | 7.48 | 16.63 |
| Found | 60.38 | 7.51 | 16.63 |

EXAMPLE 12

To 50 ml. of tetralin are added 10 g. of 3-dimethyl aminosydnone and 5.5g. of 1-octyne, and the mixture is refluxed at 200°–210° C for 10 hours. After tetralin is removed by vacuum distillation, the residue is column-chromatographed on a column of 400 g. of silica gel, using benzene as a developing solvent. The objective fractions are collected and the solvent is removed by distillation. The residue is fractionated by vacuum distillation, whereby a fraction of 1-dimethylamino-3-(n-hexyl)pyrazole boiling at 84°–85° C/2 mm Hg. is obtained.

Analysis $C_{11}H_{21}N_3$

|  | C(%) | H(%) | N(%) |
|---|---|---|---|
| Calculated | 67.64 | 10.84 | 21.52 |
| Found | 67.58 | 10.80 | 21.31 |

What is claimed is

1. A 1-(disubstituted-amino)pyrazole compound of the formula:

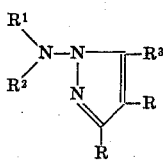

wherein each of $R^1$ and $R^2$ stands for lower alkyl or $R^1$ and $R^2$, taken together with the adjacent N-atom form morpholino, piperidino, pyrrolidino, N-methylpiperazino, N-benzylpiperazino and N-phenylpiperazino, R's, which are the same or different from each other, stand for hydrogen, alkyl of one to ten carbon atoms, phenyl, naphthyl, phenyl or naphthyl substituted by halogen or lower alkyl, respectively, and $R^3$ stands for hydrogen, lower alkyl, N,N-di-loweralkylaminomethyl, N-morpholinomethyl, N-piperidinomethyl, N-pyrrolidinomethyl, N-methylpiperazinomethyl, N-benzylpiperazinomethyl and N-phenylpiperazinomethyl.

2. A compound as claimed in claim 1, wherein the 1-di-substituted(-amino)pyrazole compound is in the form of a pharmaceutically acceptable acid salt.

3. A compound as claimed in claim 2, wherein the salt is hydrochloride.

4. A compound as claimed in claim 1, wherein both $R^1$ and $R^2$ are methyl.

5. A compound as claimed in claim 1, wherein said compound is
   1-dimethylamino-3-phenylpyrazole.

6. A compound as claimed in claim 1, wherein said compound is
   1-dimethylamino-3-phenyl-4-methylpyrazole.

7. A compound as claimed in claim 1, wherein said compound is
   1-dimethylamino-4-(p-chlorophenyl)-5-methylpyrazole.

8. A compound as claimed in claim 1, wherein said compound is
   1-dimethylamino-3-(p-tolyl)pyrazole.

9. A compound as claimed in claim 1, wherein said compound is
   1-dimethylamino-3-(p-chlorophenyl)pyrazole.

10. A compound as claimed in claim 1, wherein said compound is
    1-dimethylamino-3-(p-chlorophenyl)-5-methylpyrazole.

* * * * *